United States Patent [19]

Yamai et al.

[11] 4,065,411

[45] Dec. 27, 1977

[54] PROCESS FOR THE PREPARATION OF EXPANDABLE STYRENE POLYMER PARTICLES

[75] Inventors: Fumito Yamai, Kusatsu; Tomohiko Ishida; Yoshinori Ikeda, both of Shiga, all of Japan

[73] Assignee: Sekisui Kaseihin Kogyo Kabushiki Kaisha, Nara, Japan

[21] Appl. No.: 746,251

[22] Filed: Dec. 1, 1976

Related U.S. Application Data

[63] Continuation of Ser. No. 582,891, June 2, 1975, abandoned.

[30] Foreign Application Priority Data

June 3, 1974 Japan .................................. 49-63336

[51] Int. Cl.$^2$ ................................................ C08J 9/18
[52] U.S. Cl. ............................ 260/2.5 B; 260/2.5 HB; 260/2.5 FP
[58] Field of Search ....................... 260/2.5 B

[56] References Cited

U.S. PATENT DOCUMENTS

| 2,893,963 | 7/1959 | Cleland et al. | 260/2.5 B |
|---|---|---|---|
| 2,911,381 | 11/1959 | Rotti | 260/2.5 B |
| 3,442,881 | 5/1969 | John et al. | 260/2.5 B |
| 3,494,879 | 2/1970 | Ackerman | 260/2.5 B |
| 3,501,426 | 3/1920 | Yu | 260/2.5 B |
| 3,632,288 | 1/1972 | Niechwiadowicz | 260/2.5 B |
| 3,650,992 | 3/1972 | Schwoegler | 260/2.5 B |
| 3,832,312 | 8/1924 | Wright | 260/2.5 B |

*Primary Examiner*—Morton Foelak
*Attorney, Agent, or Firm*—Armstrong, Nikaido & Marmelstein

[57] ABSTRACT

A process for preparing expandable styrene polymer particles by using calcium hydroxide as a suspending agent to prevent agglomeration of styrene polymer particles during impregnation with an expanding agent. The process comprises preparing expandable styrene polymer particles from styrene polymer particles in water, wherein the expanding agent (which does not dissolve styrene polymer particles or slightly swells the particles and has a boiling point lower than the softening point of the particles) is added in the presence of the suspending agent and the particles being impregnated thereby.

6 Claims, No Drawings

PROCESS FOR THE PREPARATION OF EXPANDABLE STYRENE POLYMER PARTICLES

This is a continuation of application Ser. No. 582,891 filed June 2, 1975, now abandoned.

BACKGROUND OF THE INVENTION

Expandable styrene polymer particles are conventionally prepared by means of a process of dispersing styrene polymer particles in water to from a suspension, wherein an expanding agent is then added to impregnate the particles as disclosed in the specification of U.S. Pat. Nos. 2,893,963 and 2,950,261. But there has been a tendency of such particles, during the impregnation, to agglomerate or stick together to form large clumps, because of the solvent action of the expanding agent during the impregnation of the polymer particles with the expanding agent.

In order to prevent agglomeration of the polymer particles during the step of impregnation, suspending agents are generally used. As the suspending agents, the following compounds are well known, for example, partially saponified polyvinylalcohol, polyacrylate, polymethacrylate, polyvinylpyrrolidone, carboxymethyl cellulose, ethyl cellulose, methyl cellulose, sodium alginate which are water-soluble organic compounds having protective colloidal properties. The above compounds are generally used together with surface active agents or sodium pyrophosphate etc. in order to increase their suspension activity.

There is a tendency, however, to produce agglomerated particles when using the above-described water-soluble organic compounds as suspending agents at a higher temperature, and it is necessary to carefully add the expanding agent in parts or a little at a time continuously when using an expanding agent which is in liquid form at ordinary conditions, e.g. room temperature and atmospheric pressure, such as n-pentane. Such restrictions in the step of impregnation are disadvantageous, since they cause lower producitivity. Furthermore, this presents environmental problems, since it is very difficult to remove the waste water after impregnation.

Suspending agents are disclosed in the specifications of U.S. Pat. No. 2,983,692 and Great Britain Pat. No. 1,202,833: e.g. slightly water-soluble, fine powders of inorganic substances such as tertiary calcium phosphate, magnesium pyrophosphate, calcium carbonate, calcium silicate and bentonite, metal salts of an aliphatic acid such as calcium stearate and zinc stearate, and organic fine powders such as the bis-amide of an aliphatic acid, for example, ethylene-bis-stearoamide, etc. However, the above-mentioned suspending agents are not economical, since each of the above-mentioned suspending agents must be used in large quantities, i.e. no less than 1% by weight of styrene polymer particles, when used alone, in order to prevent the agglomeration of the polymer particles caused by the expanding agent and/or softening agent.

Therefore, a method has been generally adopted of using the fine powders in combination with a surface active agent in order to increase the suspension activity. For example, U.S. Pat. No. 2,687,408, U.S. Pat. No. 2,715,118 and U.S. Pat. No. 2,983,692 show that good results were obtained by using anionic surface active agents with inorganic fine powders. Especially stable suspension activity was obtained by using smaller amounts of a suspending agent consisting of phosphate or pyrophosphate, such as tertiary calcium phosphate, hydroxyapatite and magnesium pyrophosphate in combination with a small quantity of sodium dodecylbenzenesulfonate or sodium laurylalcohol-sulfate ester. When using organic fine powders such as calcium stearate and ethylene-bis-amide, not only may anionic surface active agents be used but also nonionic and amphoteric surface active agents may be used in order to increase the suspension activity. However, such suspending agents are generally not excellent agents.

Surface active agents have been used in combination with slightly water-soluble, fine powders as suspending agents in order to increase the suspension activity. However, it is very difficult to recover and/or release the expanding agent after the impregnation step, due to the vigorous foaming caused by the remaining expanding agent when using a surface active agent and an expanding agent such as propane or butane. It is necessary, therefore, to use an anti-foam agent in order to reduce the amount of foam. It is also difficult to completely remove the waste water containing the surface active agent by ordinary equipment used for treating waste water.

Inorganic compounds including phosphor, such as phosphate or pyrophosphate, become one of the nutritive substances when discharged into a river or lake and such discharging will by limited by means of the present invention to protect the environment in the future.

After investigating a process for improving the above processes, the inventors of the present invention have found that excellent suspension stability is obtained by using a small amount of calcium hydroxide as the suspending agent, without the need of using it in combination with surface active agents.

SUMMARY OF THE INVENTION

Expandable styrene polymer particles are produced having excellent suspension stability by using calcium hydroxide as the suspending agent. The process comprises the steps of dispersing styrene polymer particles in water and adding thereto and in the presence of a suspending agent an expanding agent which does not dissolve the particles or slightly swells the particles, has a boiling point lower than the softening pont of the polymer particles and is gaseous or liquid at ordinary conditions.

DETAILED DESCRIPTION OF THE INVENTION

The present invention relates to a process for the production of expandable styrene polymer particles which comprises using calcium hydroxide as the suspending agent in a process which comprises dispersing styrene polymer particles in water and adding thereto an expanding agent.

According to the present invention, it is sufficient to use only calcium hydroxide as the suspending agent. In the step of removing or releasing the remaining expanding agent after impregnation of the styrene polymer particles, the forming of foam is not observed in the present invention, while heretofore vigorous foaming was observed when surface active agents and/or water soluble organic compounds were used. The process of the present invention, therefore, is a superior process from the commercial point of view. The process of the present invention provides advantages for the treatment of waste water, since calcium hydroxide is neutralized with hydrochloric acid to produce water-soluble calcium chloride which is easily removed from the system. Therefore, the procedure for treating waste water is less complicated in comparison with procedures using surface active agents and/or water-soluble organic compounds having protective colloidal properties.

Calcium hydroxide used in the present invention may be that which is currently available on the market. Fine powders passing a screen having a 325 mesh (44μ sieve mesh, ASTM) are especially preferable. Generally, the amount of calcium hydroxide to be used is in the range of from about 0.3 to about 1.5 weight % based on the polymer particles. The amount of calcium hydroxide, however, may be varied depending on the size of the polymer particles to be used, ratio of polymer particles and water, kind of expanding agent and other additives. Where calcium hydroxide is used in an amount of less than 0.3 weight %, there is a tendency to cause agglomeration of the polymer particles, and where it is used in an amount of more than 1.5 weight %, it is not economical, since further advantages are not obtained.

It is possible to add an expanding agent in the reaction system over a wide range of temperatures, for example, from ordinary temperatures, or from 0° C to 125° C, and preferably from 20° C to 125° C when calcium hydroxide is used as the suspending agent. In the case of using an expanding agent which is in liquid form at room temperature such as n-pentane, it is preferable to add such expanding agent at lower temperatures and increase to temperatures above 90° C to impregnate, since it is possible to obtain stable impregnation of the polymer particles without causing agglomeration. In the case of adding n-pentane in the reaction system at temperatures above 100° C, it is possible to impregnate without causing agglomeration by feeding n-pentane incrementally according to the speed of absorption of n-pentane into the polymer particles.

Steps for the production and operation of the present invention are very simplified as it is sufficient to use only calcium hydroxide as the suspending agent to obtain desirable results and it is not necessary to use calcium hydroxide in combination with organic or inorganic fine powders, surface active agents or organic compounds having protective colloidal properties.

Styrene polymer particles which may be used in the present invention include: styrene polymer particles prepared by the polymerization of vinyl aromatic monomers including styrene, vinyltoluene, isopropylstyrene, alpha-methylstyrene, nuclear methylstyrene, chlorostyrene, tert-butylstyrene, etc.; styrene copolymer particles prepared by the copolymerization of a styrene monomer with monomers such as 1,3-butadiene, alkyl acrylate (for example, butyl acrylate, ethyl acrylate and 2-ethylhexyl acrylate), alkyl methacrylate (for example, methyl methacrylate, ethyl methacrylate, butyl methacrylate and 2-ethylhexyl methacrylate), acrylonitrile, vinyl acetate, alpha-methylethylene, divinyl benzene, dimethyl maleate and diethyl maleate, wherein the styrene monomer is present in an amount of at least about 50% by weight based on the copolymer.

Styrene polymer particles can, of course, be produced by any of the known techniques, for example by suspension or mass polymerization, to obtain particles in the form of beads or pellets.

Such polymer particles have an average particle diameter of from 0.2–6 mm.

The polymer particles are dispersed in water, the amount of water being 0.7–5 times, and preferably 0.8–2 times the weight of the polymer particles employed.

The expanding agents employed in the present invention include those (1) which do not dissolve the styrene polymer particles or slightly swells the polymer particles, (2) which have a boiling point lower than the softening point of the above described polymer and (3) which are gaseous or liquid at ordinary conditions. Such expanding agents are disclosed in the specification of U.S. Pat. No. 2,983,692 and U.S. Pat. No. 2,893,963. Examples of such suitable expanding agents include aliphatic hydrocarbons having from 1 to 6 carbon atoms and preferably from 3 to 5 carbon atoms such as propane, n-butane, isobutane, n-pentane, neo-pentane, isopentane and n-hexane; cycloaliphatic hydrocarbons such as cyclopentane, cyclohexane, etc., and halogenated hydrocarbons such as methyl chloride, ethyl chloride, dichlorodifluoromethane, chlorodifluoromethane and trichlorofluoromethane. These expanding agents are impregnated into the polymer particles in an amount of from about 3% to about 15% by weight of the styrene polymer particles.

Flame retardants such as tris (2,3-dibromopropyl) phosphate, tribromophenylallyl ether and hexabromocyclododecane, and auxiliary agents for flame retardants such as organic peroxide may also be used in this invention. Dyestuffs, antistatic agents, etc. may also be used.

The following examples are given to further illustrate the invention, and are not intended to limit the scope thereof.

EXAMPLE 1

2,200 g of water and 11 g of calcium hydroxide (suspending agent) were placed into a 5.6 l autoclave. The calcium hydroxide used in this example has the following analytical data:

$H_2O$:0.3%

Ignition Loss:24.51%

$SiO_2$:0.25%

$Fe_2O_3$ and $Al_2O_3$:0.18%

CaO:74.36%

MgO:0.50%

$CO_2$:0.82% passing through 300 mesh sieve (ASTM) 99.2%

To this mixture, 2,200 g of styrene polymer particles having a particle diameter size of 0.6–1.0 mm were added. After the autoclave was made air-tight and the mixture was stirred at the speed of 320 rpm, 198 g of n-pentane as the expanding agent were added under pressure and the temperature was increased to 110° C. After the impregnation for 3 hours at 110° C, the mixture was cooled to 30° C., removed from the reactor, neutralized with hydrochloric acid, washed with water and dried. The product of expandable styrene polymer particles showed no agglomerated particles.

After ageing for 1 week, the polymer particles were pre-expanded by steam to particles having a density of 0.02 g/cc. Good cellular shaped articles were obtained on the next day by molding the pre-expanded polymer particles in a mold with steam.

EXAMPLE 2

2,200 g of water and 11 g of calcium hydroxide, as described in Example 1, were added to a 5.6 l autoclave and 2,200 g of styrene-butyl acrylate copolymer, which consists of 98 parts of styrene and 2 parts of butyl acrylate and having a 1.0–0.6 mm diameter were also added. After the autoclave was made air-tight and while the mixture was stirred at the speed of 320 rpm, the temperature was increased to 90° C. While maintaining this temperature, 220 g of n-butane were added as the expanding agent. After impregnation at the same temperature for 5 hours, the mixture was cooled to 30° C, and the remaining gas was released from a relief valve. Blocking of the valve by foam was not observed in this case, and the remaining gas was easily released.

The expandable polymer particles were removed from the reactor and neutralized with hydrochloric acid, washed with water and dried. Expandable styrene-butyl acrylate copolymer particles having no agglomerated particles were obtained.

COMPARATIVE EXAMPLE 1

As a comparison with the results of Examples 2, the procedure of Example 2 was substantially repeated except that 11 g of magnesium pyrophosphate and 0.33 g of dodecylbenzene sulfonate were used instead of calcium hydroxide. After adding n-butane, the mixture was cooled to 30° C. It was observed that most of the remaining expanding agent could not be released through the valve due to blocking of the valve caused by foaming of the mixture employed as the suspending agent.

EXAMPLE 3

2,200 g of water and 11 g of calcium hydroxide as described in Example 1 were added to a 5.6 l autoclave and 2,200 g of styrene polymer particles having a 1.0–0.6 mm diameter were also added. To this mixture, 27 g of tribromophenylallyl ether were added to a flame retardant agent while stirring at the speed of 320 rpm. After the autoclave was made air-tight, 176 g of n-pentane (expanding agent) were added at a temperature of 30° C. The mixture was heated at 110° C. over a period of 60 minutes and impregnated at the same temperature for 4 hours. After cooling to 30° C., the mixture was removed from the reactor and neutralized with hydrochloric acid, washed with water and dried. Flame retardant expandable styrene polymer particles were obtained. The obtained polymer particles showed no agglomerated particles.

EXAMPLE 4

2,200 g of water and 22 g of calcium hydroxide, as described in Example 1, were added to a 5.6 l autoclave and 2,200 g of styrene polymer particles of 0.5–0.3 mm diameter were also added. After the autoclave was made air-tight and the mixture was stirred at the speed of 320 rpm, 154 g of n-pentane (expanding agent) were added to the above mixture of 30° C. and the mixture was heated to 110° C. over a period of 60 minutes. After maintaining the mixture at the same temperature as the above for 30 minutes, the mixture was cooled to 30° C. and removed.

The resulting expandable polymer particles showed no agglomerated particles. From this example, it will be recognized that impregnation of polymer particles having a small size can be easily carried out by using 1 weight % of calcium hydroxide.

EXAMPLE 5

Expandable polymer particles were prepared by the process as described in Example 1, except that cross-linked styrene-divinylbenzene copolymer particles having a 1.0–0.6 mm diameter consisting of 99.98 parts of styrene and 0.02 parts of divinylbenzene were used instead of styrene polymer particles. The resulting expandable copolymer particles showed no agglomerated particles.

In place of the particular polymer particles and expanding agents employed in the Examples, other polymer particles and expanding agent as hereinbefore described may be substituted therefore to obtain substantially the same results.

What is claimed is:

1. In the process for the preparation of expandable styrene polymer particles comprising impregnating said particles with an expanding agent in the absence of surface active agents, the improvement which comprises employing in the process calcium hydroxide in an amount from 0.3 to 1.5% by weight of the styrene polymer particles, as the sole suspending agent.

2. The process of claim 1, wherein the styrene polymer particles are polymer particles prepared by the polymerization of a vinyl aromatic monomer selected from the group consisting of styrene, vinyltoluene, isopropylstyrene, alpha-methylstyrene, nuclear methylstyrene, chlorostyrene and tertiary-butylstyrene.

3. The process of claim 1, wherein the styrene polymer particles are styrene copolymer particles prepared by the copolymerization of a styrene monomer and a monomer selected from the group consisting of 1,3-butadiene, alkyl acrylate, alkyl methacrylate, acrylonitrile, vinyl acetate, α-methylethylene, vinyl benzene and dialkyl maleate, wherein the sytrene monomer is present in an amount of at least about 50% by weight of the copolymer.

4. The process of claim 1, wherein the expanding agent is a hydrocarbon selected from the group consisting of propane, n-butane, isobutane, n-pentane, neo-pentane, isopentane, n-hexane, cyclopentane and cyclohexane.

5. The process of claim 1 wherein the expanding agent is a halogenated hydrocarbon selected from the group consisting of methyl chloride, ethyl chloride, dichlorodifluoromethane, chlorodifluoromethane and trichlorofluoromethane.

6. The process of claim 4, wherein said expanding agent is used in an amount from about 3 to about 15% by weight of the styrene polymer particles.

* * * * *